United States Patent [19]

Habu

[11] 4,129,100

[45] Dec. 12, 1978

[54] INTERNAL COMBUSTION ENGINE WITH AN AUXILIARY CHAMBER

[75] Inventor: Nobuo Habu, Susono, Japan

[73] Assignee: Toyota Jidosha Kogyo Kabushiki Kaisha, Toyota, Japan

[21] Appl. No.: 804,164

[22] Filed: Jun. 6, 1977

[30] Foreign Application Priority Data

Apr. 6, 1977 [JP] Japan .................................. 52-38489

[51] Int. Cl.² ............................................... F02B 3/00
[52] U.S. Cl. ................................. 123/32 L; 123/32 SP
[58] Field of Search ............... 123/32 L, 32 SP, 191 S, 123/191 SP

[56] References Cited

U.S. PATENT DOCUMENTS 4,038,959  8/1977  Takizawa ........................... 123/32 L

FOREIGN PATENT DOCUMENTS 949014  8/1956  Fed. Rep. of Germany ........ 123/32 L
986326  7/1951  France ................................... 123/32 L Primary Examiner—Ronald B. Cox Attorney, Agent, or Firm—Stevens, Davis, Miller & Mosher

[57] ABSTRACT

Disclosed is an internal combustion engine comprising a main chamber and an auxiliary chamber which are interconnected with each other via a connecting passage. The connecting passage is tangentially connected to the inner wall of the auxiliary chamber. A raised portion is formed on the inner wall of the auxiliary chamber at a position located opposite to the inner wall to which the connecting passage is tangentially connected with respect to the axis of the auxiliary chamber. A recess is formed on the inner wall beneath the raised portion. The nozzle of a fuel injector is directed to the recess so as to form a rich air-fuel mixture therein. The spark gap of a spark plug is located in the recess for igniting the righ air-fuel mixture therein. An additional passage communicating the recess with the main chamber is formed in the cylinder head so that gas forced into the recess from the main chamber through the additional passage at the time of the compression stroke directly impinges upon the insulator covering the central electrode of the spark plug for diluting the rich air-fuel mixture formed around the insulator of the central electrode.

8 Claims, 8 Drawing Figures

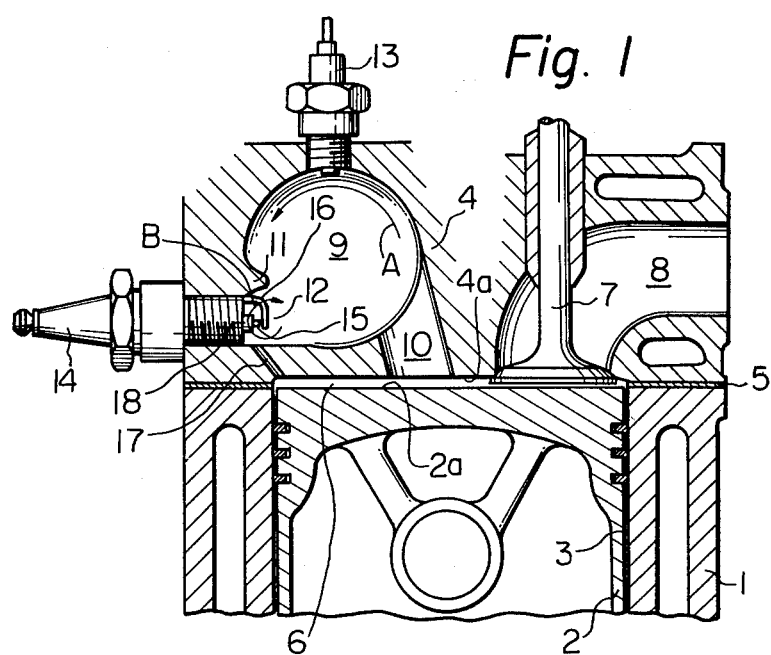
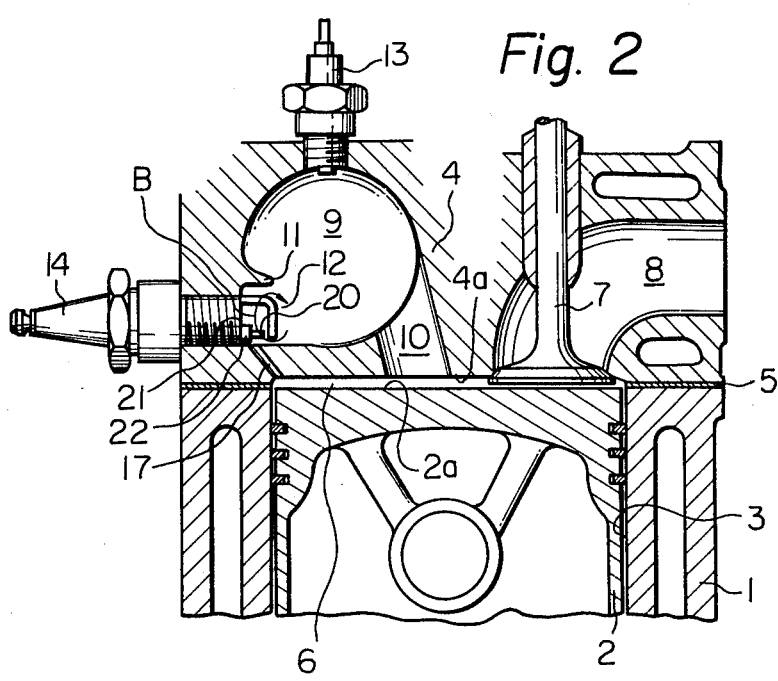

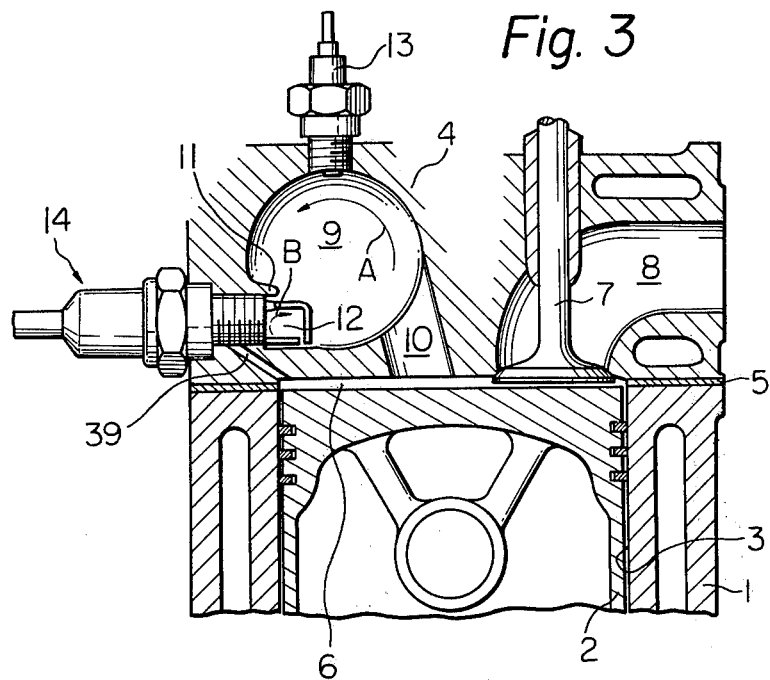
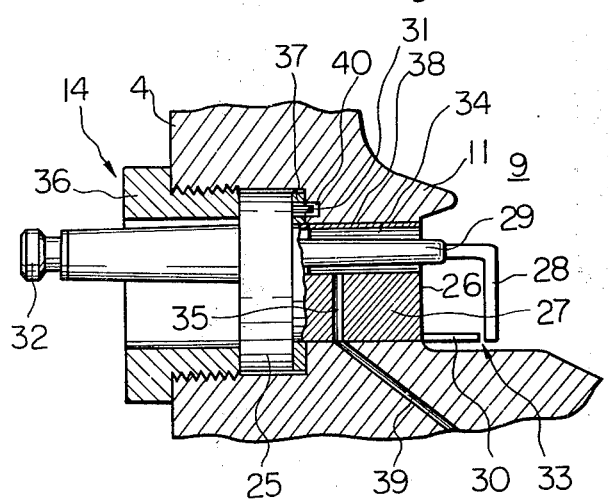

INTERNAL COMBUSTION ENGINE WITH AN AUXILIARY CHAMBER

DESCRIPTION OF THE INVENTION

The present invention relates to an internal combustion engine provided with an auxiliary chamber.

In order to reduce the amount of harmful components in exhaust gas and improve the fuel consumption, it is preferable to use a lean air-fuel mixture. However, the lean air-fuel mixture has a disadvantage in that ignition cannot easily carried out. Consequently, in the case wherein a lean air-fuel mixture is used, a combustible mixture is stratified so as to form a lean air-fuel mixture layer and a rich air-fuel mixture layer in the combustion chamber of the engine and, in addition, the spark gas of a spark plug is arranged in the rich air-fuel mixture layer so that the rich air-fuel mixture is ignited by the spark plug, thereby obtaining an ease of ignition.

As such a stratified engine, there has been known an internal combustion engine in which a combustion chamber comprises a main chamber and an auxiliary chamber which are interconnected with each other via a connecting passage. The connecting passage is tangentially connected to the inner wall of the auxiliary chamber, and a recess is formed on the inner wall of the auxiliary chamber at a position located opposite to the inner wall to which the connecting passage is tangentially connected with respect to the axis of the auxiliary chamber. A spark plug and a fuel injector are disposed in the auxiliary chamber so that a rich air-fuel mixture is formed in the recess by the fuel injected from the fuel injector at the time of ignition, and the rich air-fuel mixture thus formed is ignited by the spark plug.

In an internal combustion engine of this type, the spark plug is located in the recess in which a rich air-fuel mixture is formed. However, if the spark plug is arranged so as to ignite a rich air-fuel mixture as mentioned above, the carbon particles produced at the time of combustion are caused to adhere onto the insulator covering the mounting end of the central electrode of the spark plug. As a result of this, since the electric current is leaked to the body of the spark plug via the carbon particles from the central electrode, a strong spark can not be obtained. Therefore, it is impossible to supply a rich air-fuel mixture with a satisfactory ignition energy and, as a result, there occurs a problem in that good combustion can not be obtained.

An object of the present invention is to provide an internal combustion engine provided with an auxiliary chamber, which is capable of always supplying a rich air-fuel mixture with a strong ignition energy.

According to the present invention, there is provided an internal combustion engine comprising:

- a cylinder block having a cylinder bore therein;
- a cylinder head having a cavity therein and mounted on said cylinder block, said cavity having an inner wall which defines an auxiliary chamber with an axis;
- a piston reciprocally movable in said cylinder bore, said piston and said cylinder head forming a main chamber therebetween;
- an intake valve movably mounted on said cylinder head for leading gas into said main chamber;
- an exhaust valve movably mounted on said cylinder head for discharging exhaust gas into the atmosphere;
- a connecting passage communicating said main chamber with said auxiliary chamber and arranged to be tangentially connected to the inner wall of said auxiliary chamber, the inner wall of said auxiliary chamber having a recess at a position located opposite to the inner wall to which said connecting passage is tangentially connected with respect to the axis of said auxiliary chamber;
- a fuel injector having an injecting nozzle disposed in said auxiliary chamber and directed to said recess for forming a rich air-fuel mixture therein at the time of the compression stroke;
- a spark plug having a central electrode and an earthing electrode which define a spark gap therebetween located in said recess for igniting the rich air-fuel mixture therein, said central electrode having a mounting end covered by an insulator, and;
- passage means communicating said recess with said main chamber for leading the gas in said main chamber into the space around said insulator at the time of the compression stroke to dilute a rich air-fuel mixture formed around said insulator.

The present invention may be more fully understood from the description of preferred embodiments of the invention set forth below, together with the accompanying drawings.

BRIEF DESCRIPTION OF THE DRAWINGS

In the drawings:

FIG. 1 is a cross-sectional side views of an embodiment of an internal combustion engine according to the present invention;

FIG. 2 is a cross-sectional side view of a further embodiment according to the present invention;

FIG. 3 is a cross-sectional side view of a still further embodiment according to the present invention;

FIG. 4 is an enlarged view of the spark plug shown in FIG. 3;

DESCRIPTION OF PREFERRED EMBODIMENTS

Figure 5:
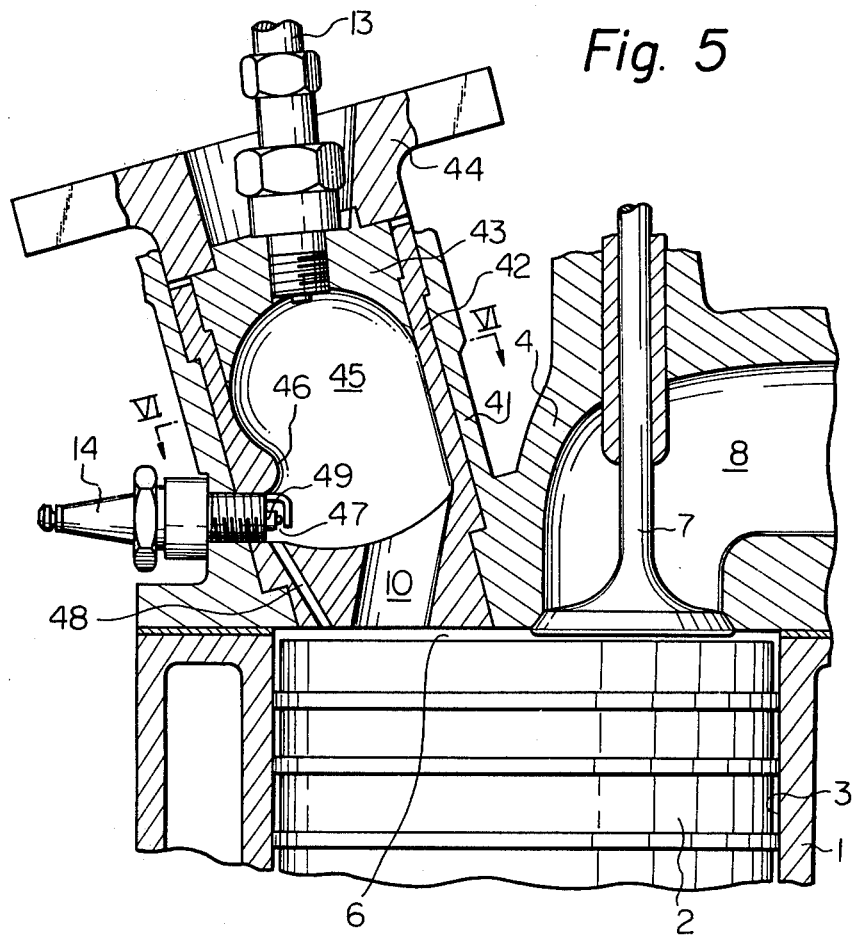
FIG. 5 is a cross-sectional side view of a still further embodiment according to the present invention.

Referring to FIG. 1, 1 designates a cylinder block, 2 a piston reciprocally movable in a cylinder bore 3 and having a flat top surface 2a, 4 a cylinder head fixed onto the cylinder block 1 via a gasket 5 and having a flat inner wall 4a, and 6 a main chamber formed between the top surface 2a of the piston 2 and the inner wall 4a of the cylinder head 4; 7 designates an intake valve, 8 an intake port, 9 a spherical auxiliary chamber formed in the cylinder head 4 and 10 a connecting passage communicating the auxiliary chamber 9 with the main chamber 6. This connecting passage 10 is tangentially connected to the inner wall of the auxiliary chamber 9. A raised portion 11 is formed on the inner wall of the auxiliary chamber 9 at a position located opposite to the inner wall to which the connecting passage 10 is tangentially connected with respect to the vertical central axis of the auxiliary chamber 9. A recess 12 is formed beneath the raised portion 11. A fuel injector 13 and a spark plug 14 are disposed in the auxiliary chamber 9, and the injecting nozzle of the fuel injector 13 is directed to the recess 12. In addition, a spark gap formed between a central electrode 15 and an earthing electrode 16 of the spark plug 14 is arranged in the recess 12. A passage 17 communicating the recess 12 with the main chamber 6 is formed in the cylinder head 4 so that the opening of the passage 17 is directed to an insulator 18 covering the mounting end of the central electrode of the spark plug 14.

In operation, at the time of the intake stroke, a suction gas such as air or a lean air-fuel mixture, or a suction gas containing a recirculated exhaust gas therein is introduced into the main chamber 6 via the intake valve 7. Then, at the time of the compression stroke, the suction gas introduced into the main chamber 6 is forced into the auxiliary chamber 9 and, as a result, a strong swirl motion as shown by an arrow A is created in the auxiliary chamber 9. On the other hand, a swirl motion as shown by an arrow B is caused in the recess 12 by the strong swirl motion A. The fuel injecting operation of the fuel injector 13 is started when the piston reaches approximately bottom dead center at the beginning of the compression stroke, and said fuel injecting operation is completed when the piston reaches a point corresponding to approximately 120° before top dead center. While a large part of the fuel injected from the fuel injector 13 towards the recess 12 remains in the recess 12, the remaining small part of the fuel is diffused into the auxiliary chamber 9 and, as a result, a lean air-fuel mixture is formed in the auxiliary chamber 9. On the other hand, as stated previously, the swirl motion B is created in the recess 12. Consequently, the vaporization of the liquid fuel adhering to the inner wall of the recess 12 is promoted by the swirl motion B and by the heat of the inner wall of the recess 12 and, as a result, a rich air-fuel mixture is formed in the recess 12. After this, the rich air-fuel mixture thus formed in the recess 12 is ignited by the spark plug 14. The flame of the rich air-fuel mixture thus ignited propagates into the auxiliary chamber 9 and, thus, the lean air-fuel mixture formed in the auxiliary chamber 9 is burned.

In an internal combustion engine shown in FIG. 1, during the time of the compression stroke, the suction gas is forced into the recess 12 from the main chamber 6 and continues to directly impinge upon the insulator 18 of the central electrode 15 of the spark plug 14. When fuel is injected from the fuel injector 13, the liquid fuel is caused to adhere to the outer surface of the insulator 18 and onto the inner wall of the recess 12. Then, since this liquid fuel is vaporized, a rich air-fuel mixture is formed around the insulator 18. However, since the liquid fuel adhering to the surface of the insulator 18 is instantaneously vaporized by the suction gas impinging upon the insulator 18 as mentioned above and, then, the fuel vapor thus vaporized is carried away into the auxiliary chamber 9, the mixture located around the insulator 18 becomes a lean air-fuel mixture. Consequently, even if the rich air-fuel mixture in the recess 12 is ignited by the spark plug 14 and, then, the lean air-fuel mixture located around the insulator 18 is ignited, since a lean air-fuel mixture produces carbon particles at the time of combustion, carbon particles are not caused to adhere to the insulator 18. As a result of this, since the entire electric current fed to the central electrode 15 of the spark plug 14 can be used as ignition energy, a strong spark can be always obtained.

FIG. 2 shows another embodiment according to the present invention. In this embodiment, the central electrode 20 is arranged on the peripheral edge of the electrode mounting end face 21 of the spark plug 14 and, therefore, the insulator 22 is arranged on the peripheral edge of the electrode mounting end face 21. Consequently, in this embodiment, the insulator 22 can be arranged in the vicinity of the opening of the passage 17. As a result of this, since it assures that the suction gas injected from the passage 17 can impinge upon the insulator 22, the gas located around the insulator 22 can consist of an air or a lean air-fuel mixture at the time of ignition.

FIG. 3 shows a further embodiment according to the present invention. In addition, FIG. 4 shows an enlarged view of the spark plug 14 shown in FIG. 3. Referring to FIG. 4, the spark plug 14 comprises a housing 27 having an increased diameter portion 25 and an electrode mounting end face 26, a central electrode 28, an insulator 29 covering the mounting end of the central electrode 28, an earthing electrode 30, a positioning pin 31 fixed onto the increased diameter portion 25, and a terminal 32. The central electrode 28 is formed in an L shape, and a spark gap 33 is formed between the tip of the central electrode 28 and the earthing electrode 30. The insulator 29 is arranged on the peripheral edge of the electrode mounting end face 26 at a position located opposite to the spark gas 33 with respect to the axis of the spark plug 4. On the other hand, as is shown in FIG. 4, an annular space 34 is formed in the housing 27 around the insulator 29 and, in addition, a connecting hole 35 communicating the annular space 34 with the outside of the housing 27 is formed in the housing 27. The housing 27 of the spark plug 14 is fixed onto the cylinder head 4 via a gasket 37 at a predetermined position in such a way that the positioning pin 31 is fitted into a hole 40 formed in the cylinder head 4 and, then, a nut 36 is screwed into the cylinder head 4. In addition, as is shown in FIGS. 3 and 4, a passage 39 communicating the main chamber 6 with a spark plug mounting hole 38 is formed in the cylinder head 4 and is arranged so as to align with the connecting hole 35 when the spark plug 14 is mounted on the cylinder head 4. Consequently, in the embodiment shown in FIG. 3, even if a rich air-fuel mixture is formed in the recess 12, a lean air-fuel mixture is formed around the insulator 29 of the central electrode 28 by the suction gas forced into the annular space 34 from the main chamber 6 via the passage 39 and the connecting hole 35 at the time of the compression stroke and, thus, it is possible to prevent carbon particles from adhering to the insulator 29.

Figure 6:
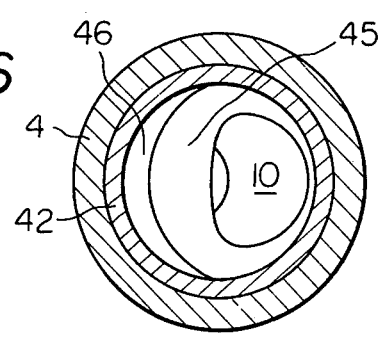
FIG. 6 is a cross-sectional view taken along the line VI—VI in FIG. 5.

FIG. 5 shows a still further embodiment according to the present invention. Referring to FIG. 5, a hole 41 having a circular cross-section is formed in the cylinder head 4, and an auxiliary chamber component 42 is fitted into the hole 41. In addition, another auxiliary chamber component 43 is fitted into the upper end of the auxiliary chamber component 42. The auxiliary chamber components 42 and 43 are rigidly fixed onto the cylinder head 4 by a fixing plate 44 fixed onto the cylinder head 4 by means of bolts (not shown). As auxiliary chamber 45 connected to the main chamber 6 via a connecting passage 10 is formed in the auxiliary chamber components 42 and 43. As is apparent from FIG. 6, the auxiliary chamber 45 has a circular cross-sectional shape. A raised portion 46 is formed on the inner wall of the auxiliary chamber 45 at a position located opposite to the inner wall to which the connecting passage 10 is tangentially connected with respect to the axis of the auxiliary chamber 45. As shown in FIG. 6, the raised portion 46 is formed so as to extend along half of the circumferential inner wall of the auxiliary chamber 45. A recess 47 is formed on the inner wall of the auxiliary chamber 45 beneath the raised portion 46. The spark gap of the spark plug 14 is arranged in the recess 47. On the other hand, a passage 48 communicating the recess 47 with the main chamber 6 is formed in the auxiliary chamber component 42 so that the opening of the passage 48 is directed to an insulator 49 covering the central electrode of the spark plug 14.

The injecting nozzle of the fuel injector 13 is directed to the recess 47 so as to form a rich air-fuel mixture in the recess 47 at the time of the compression stroke. However, during the time of the compression stroke, the suction gas is forced into the recess 47 from the main chamber 6 via the passage 48 and continues to directly impinge upon the insulator 49. As a result of this, a lean air-fuel mixture is formed around the insulator 49 and, thus, it is possible to prevent carbon particles from adhering to the insulator 49.

Figure 7:
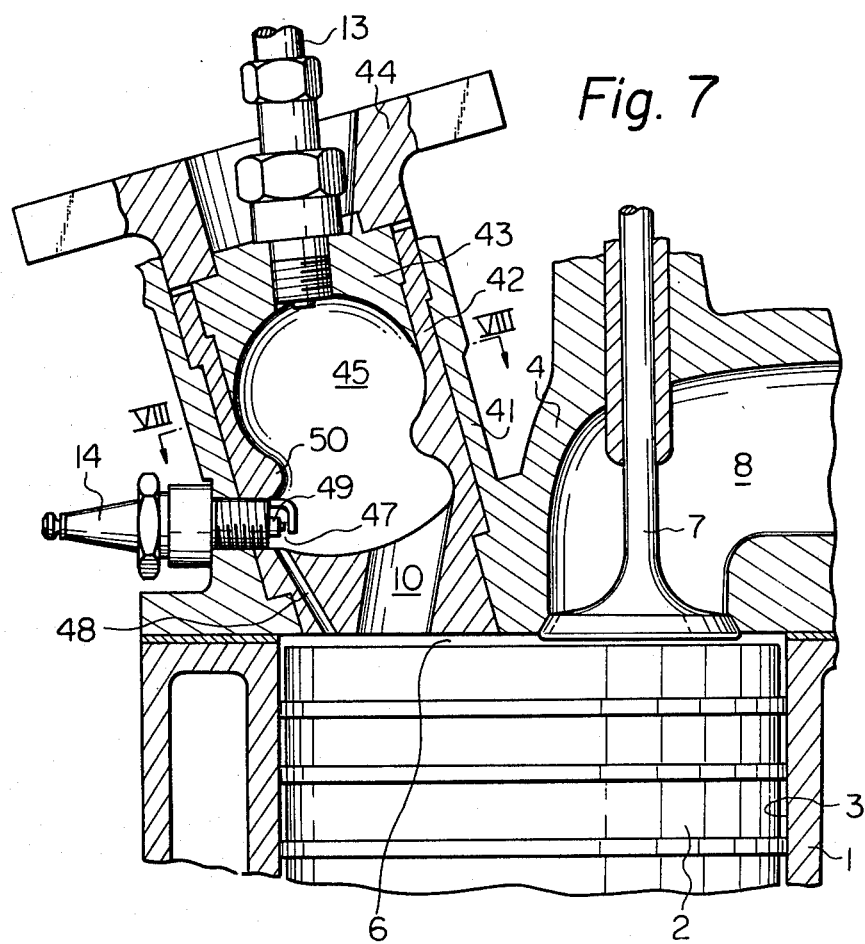
FIG. 7 is a cross-sectional side view of a still further embodiment according to the present invention.
Figure 8:
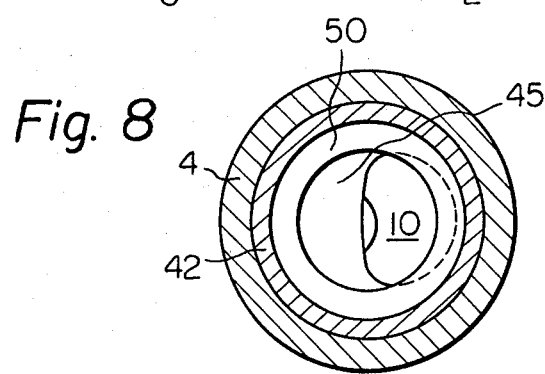
FIG. 8 is a cross-sectional view taken along the line VIII—VIII in FIG. 7.

FIG. 7 shows a still further embodiment according to the present invention. In the embodiment shown in FIG. 6, the raised portion 46 is formed so as to extend along half of the circumferential inner wall of the auxiliary chamber 45. However, in this embodiment, as is shown in FIG. 8, a raised portion 50 is formed in an annular shape along the inner wall of the auxiliary chamber 45. In the embodiment shown in FIG. 7, in the same manner as described with reference to FIG. 5, a rich air-fuel mixture is formed in the recess 47. Furthermore, in the same manner as described with reference to FIG. 5, during the time of the compression stroke, the suction gas is forced into the recess 47 from the main chamber 6 via the passage 48 and continues to directly impinge upon the insulator 49. As a result of this, a lean air-fuel mixture is formed around the insulator 49 and, thus, it is possible to prevent carbon particles from adhering to the insulator 49.

According to the present invention, since carbon particles are not caused to adhere to the insulator covering the central electrode of the spark plug, the entire electric current fed to the central electrode can be used as ignition energy. Therefore, a strong spark can be always obtained and, as a result, a stable combustion can be always obtained.

While the invention has been described by reference to specific embodiments chosen for purposes of illustration, it should be apparent that numerous modifications could be made thereto by those skilled in the art without departing from the spirit and scope of the invention.

What is claimed is:

1. An internal combustion engine comprising:
    a cylinder block having a cylinder bore therein;
    a cylinder head having a cavity therein and mounted on said cylinder block, said cavity having an inner wall which defines an auxiliary chamber with an axis;
    a piston reciprocally movable in said cylinder bore, said piston and said cylinder head forming a main chamber therebetween;
    an intake valve movably mounted on said cylinder head for leading gas into said main chamber;
    an exhaust valve movably mounted on said cylinder head for discharging exhaust gas into the atmosphere;
    a connecting passage communicating said main chamber with said auxiliary chamber and arranged to be tangentially connected to the inner wall of said auxiliary chamber, the inner wall of said auxiliary chamber having a recess at a position located opposite to the inner wall to which said connecting passage is tangentially connected with respect to the axis of said auxiliary chamber;
    a fuel injector having an injecting nozzle disposed in said auxiliary chamber and directed to said recess for forming a rich air-fuel mixture therein at the time of the compression stroke;
    a spark having a central electrode and an earthing electrode which define a spark gap therebetween located in said recess for igniting the rich air-fuel mixture therein, said central electrode having a mounting end covered by an insulator, and;
    passage means communicating said recess with said main chamber for leading the gas in said main chamber into the gas around said insulator at the time of the compression stroke to dilute a rich air-fuel mixture formed around said insulator.

2. An internal combustion engine as claimed in claim 1, wherein said passage means has an open end opening into said recess and arranged to be directed to said insulator so that the gas forced into said recess from said main chamber via said passage means at the time of the compression stroke directly impinges upon said insulator.

3. An internal combustion engine as claimed in claim 2, wherein said spark plug has an electrode mounting end face on which said central electrode and said earthing electrode are mounted, said central electrode being mounted on the periphery of said electrode mounting end face and arranged in the vicinity of the open end of said passage means.

4. An internal combustion engine as claimed in claim 1, wherein a raised portion is formed on the inner wall of said auxiliary chamber, said recess being formed on the inner wall of said auxiliary chamber beneath said raised portion.

5. An internal combustion engine as claimed in claim 4, wherein said raised portion is arranged at a position located opposite to the wall to which said connecting passage is tangentially connected with respect to the axis of said auxiliary chamber.

6. An internal combustion engine as claimed in claim 4, wherein said raised portion is formed in an annular shape along the inner wall of said auxiliary chamber.

7. An internal combustion engine as claimed in claim 1, wherein said spark plug comprises a housing having thereon an electrode mounting end face on which said central electrode and said earthing electrode are mounted, and a hole formed in said electrode mounting end face and receiving the mounting end of said central electrode, said passage means comprising a passage communicating said hole with said main chamber.

8. An internal combustion engine as claimed in claim 7, wherein said hole is formed in the periphery of said electrode mounting end face, the central electrode of said spark plug being arranged on the periphery of said electrode mounting end face at a position located opposite to said hole with respect to an axis of the housing of said spark plug.

* * * * *